Patented Oct. 31, 1933

1,933,445

UNITED STATES PATENT OFFICE 1,933,445

MANUFACTURE OF FERTILIZERS BY ALKALINE DIGESTION OF CELLULOSIC MATERIALS

Harold R. Murdock, Canton, N. C., assignor to The Champion Fibre Company, Canton, N. C., a corporation of Ohio No Drawing. Application July 3, 1930
Serial No. 465,777

10 Claims. (Cl. 71—9)

This invention relates to the manufacture of commercial fertilizers and more particularly relates to the manufacture of fertilizers containing organic matter in the presence of compounds of potassium, nitrogen and phosphorus.

One of the greatest difficulties confronting the agriculturist is to obtain a cheap source of organic material to add to the soil. When organic matter in the form of humus or any other complex carbohydrates is added to the soil with or without the addition of chemicals a decided activation in vegetable growth is observed. The humus or organic matter serves as a mulch in retaining moisture within the soil and likewise acts as a food for and assists in the biological processes which are continuously in operation in the soil as the result of the activities of microorganisms such as bacteria, molds and fungi. It has been proven in many instances that the addition of pure chemicals to the soil, although these chemicals may contain satisfactory relations of phosphorus, nitrogen, and potassium compounds, is not sufficient. Crops submitted to fertilization by pure chemicals show the lack, after several years of rotation, of other cell-building materials. Organic matter seems to fill this gap.

One of the objects of this invention is to provide a fertilizing material which will not only be concentrated in relation to the potassium, nitrogen and phosphorus ingredients, but which will contain a satisfactory supply of organic material. It is not geenrally appreciated that one of the greatest wastes of the organic kingdom is in the process of pulping wood for the manufacture of paper and other similar articles. Approximately fifty (50%) per cent to sixty (60%) per cent of the wood entering into a pulp mill is not used economically. It is either washed into the streams (serving as a source of pollution) or is burned away in order to recover the inorganic constituents of the pulping solution.

Another object of this invention is to produce as a by-product a high quality cellulose suitable for the manufacture of paper and similar materials which use wood pulp as one of the raw materials. This by-product cellulose or pulp is the residue left after digesting wood with our proposed fertilizer-producing reagents. Among commonly used commercial processes of digestion of cellulosic materials such as wood, straw, etc., there appear to be none which use chemicals which are advantageous as fertilizer materials. The sulphite process uses essentially calcium bisulphite in a sulphorous acid solution. The soda process uses caustic soda as a cooking chemical while the sulphate process uses caustic soda along with a certain amount of sodium sulphide.

According to the present invention, it has been found possible to digest cellulosic material with caustic potash solution, or with a mixture of caustic potash and sulphide of potassium in solution, to obtain a pulp which is useful commercially. It has been found that such cooks made with potassium compounds are superior to those made with sodium compounds in that the pulps have a whiter color, thereby requiring less bleaching material, and also give higher strength and fold tests. In this invention a double fold effect is obtained because the residual liquors containing the soluble portions of the cellulosic materials as well as potassium compounds have a distinct advantage as a fertilizer base, and the residue from the wood is a high grade pulp suitable for use in paper manufacture.

A procedure which may be followed to produce a liquor to be suitable as a fertilizer material may be substantially as follows:

The wood or other cellulosic material is chipped or comminuted to a size such as is usually used in the manufacture of pulp. It is added to a digester of the usual type and a sufficient solution of potassium hydroxide is added. The ratio of caustic potash to the oven-dry wood may vary from 26% to 36% of the weight of the wood, a ratio of 32% being that generally practiced. The concentration of solution added is usually 75 grams of potassium hydroxide per liter, although it may vary, according to the products desired, from 50 grams to 120 grams per liter. The cellulosic materials are digested for from four to seven hours, under a pressure of from seventy (70) to one hundred and ten (110) pounds per square inch, the actual value used depending entirely on the type of fertilizer and/or pulp desired. It will be found advisable in some cases to substitute for a portion of the potassium hydroxide (one-third, for example) an equivalent amount of potassium sulphide. Such sulphide cooks give a better quality of pulp than when only potassium hydroxide is used alone. It will be obvious to any one familiar with the art of pulping wood or other cellulosic materials that these concentrations of chemicals, ratio of chemicals to wood, time and temperature of cooking can be varied widely, depending upon the type of product desired.

At the completion of the digestion of the wood with the solution of potassium hydroxide, the pulp is separated from the spent liquor and separately processed in the known manner, and the liquor preferably is subjected to neutralization by the addition of any suitable acidic neutralizing agent, such as mineral acid or organic acid, or an acidic-acting salt thereof. It is found preferable in the commercial operation of the process to use phosphoric acid or one or more of its acid salts, such, for instance, as acid calcium phosphate, to effect the neutralization of the spent liquor, inasmuch as phosphates are desirable fertilizer ingredients. Nitrogen-containing acids, such as nitric acid, also are desirable neutralization agents, for similar reasons. At this point phosphorus-, nitrogen-, or potash-containing materials, such as salts of potassium and/or ammonia, nitrates, phosphates, etc., can be added in order to obtain a desired balance of the three inorganic fertilizing materials. Liquors so prepared may be used as such for fertilizer but it is found preferable to evaporate the liquor to either a paste or a powder by any of the well-known methods used in the arts. The product is now in suitable form to be sold as a commercial fertilizer material, since all of the ingredients are present in a form readily available as plant food.

The following examples are illustrative of the process herein described and claimed:

*Example 1.*—The digester is filled with 5,000 grams of chipped chestnut wood of 34.3 per cent dryness, 2,394 c. c. of water and 2,551 c. c. of a solution containing 242 grams per liter of potassium hydroxide is also added. The digester is then heated indirectly with steam so that a temperature of 344° F. is reached and maintained for a period of two hours. The contents of the digester are then removed, the pulp filtered from the liquor and washed. The liquor is then neutralized by the addition of 1,287 c. c. of 75% phosphoric acid solution (sp. gr. 1.60). 2,968 grams of dried blood are then added to the solution in order to supply a nitrogen source. The product, after mixing well, is then dried and may be used as a fertilizer. Such a product will analyze approximately nine per cent ammonia, twenty per cent phosphoric acid and ten per cent potash.

*Example 2.*—The digester is filled with 2,400 grams of short leaf pine chips of 79.3 per cent dryness. 5,062 c. c. of water is added and then 1,008 c. c. of a solution, containing 242 grams per liter of potassium hydroxide, and then 1,452 c. c. of a solution, containing 140 grams per liter of potassium sulphide and 112 grams per liter of potassium hydroxide, are added. The digester is heated by indirect steam so that a temperature of 340° F. is reached and maintained for two and one-half hours. The contents of the digester are then removed, the pulp filtered from the liquor and washed. The liquor is now treated with 1,460 grams of di-ammonium phosphate, and then is completely neutralized by the addition of the liquor from the digestion of wood by the usual well-known calcium bisulphite process.

The liquor is then evaporated to a solid and used as a concentrated fertilizer material. A product so made has analyzed 15.8 per cent potash, 12.1 per cent ammonia and 23.5 per cent phosphoric acid.

*Example 3.*—The digestion of wood is accomplished, following the procedure given in Example 2, but neutralization is effected by using the liquor recovered from the digestion of wood by use of potassium acid sulphite.

It may be found desirable to add to the potassium hydroxide solution before digesting the wood a phosphorus-, or potassium-, or ammonium-containing material, rather than to add such materials to the spent liquors from the wood digestions. It is immaterial in the practice of this invention whether such materials are added before or after the digestion of the wood, or whether or not they are really added at all, since the liquor recovered from potash cooks is a splendid fertilizer alone.

The process of this invention eliminates the necessity of incinerating or smelting the waste liquors in order to obtain the valuable inorganic constituents, and consequently eliminates the necessity of having such recovery appartus in a pulp mill.

It is considered within the scope of this invention that a mixture of potassium and/or sodium hydroxides, with or without the addition of sodium or potassium sulphide, can be used as the digesting reagent, a material component being a potassium compound. It is obvious that there is a point in the ratio in the potash and sodium content where the fertilizing value reaches a minimum and the recovery of the chemicals by the well-known methods is best resorted to. This invention does not claim any specific relation of one salt to the other because a percentage of potash at which it becomes economical to use the recovered liquors for fertilizer material depends upon the marketable value of potash. In practice it is advisable to work with as high a potash ratio as can be economically obtained. In some cases it may be found advisable to use relatively pure potassium reagents but in most practices it will be found economical to use readily obtainable mixtures of potassium and sodium compounds without the expenditure of separating one salt from another. For instance, there are many minerals having a high potash content but along with potash is usually associated a substantial amount of sodium compounds. A digestion of these minerals with a suitable reagent yields a mixture of potassium and sodium salts which when converted into the respective hydrates will serve satisfactorily for the digestion of wood and other cellulosic materials and the preparation of fertilizer whenever the potassium content is sufficiently high to warrant so doing.

I claim:

1. A fertilizer consisting essentially of the residual matter of the waste liquor resulting from the digestion of cellulosic material with an aqueous alkaline digestion liquor containing potassium hydroxide, which residual matter has been substantially neutralized with an acidic compound from the group consisting of the acids and acid salts of nitric and phosphoric acids.

2. A fertilizer consisting essentially of the residual matter of the waste liquor resulting from the digestion of cellulosic material with an aqueous alkaline digestion liquor containing potassium hydroxide, which residual matter has been substantially neutralized with an acidic salt of an acid of the group consisting of phosphoric and nitric acids.

3. A fertilizer consisting essentially of the residual matter of the waste liquor resulting from the digestion of cellulosic material with an aqueous alkaline digestion liquor containing potassium hydroxide, which residual matter has been substantially neutralized with an acidic salt of phosphoric acid.

4. A fertilizer consisting essentially of the solid residual matter of the waste liquor resulting from the digestion of cellulosic material with an aqueous alkaline digestion liquor containing potassium hydroxide, which residual matter has been substantially neutralized with an acidic compound from the group consisting of the acids and acid salts of nitric and phosphoric acids.

5. Process which comprises substantially neutralizing with an acidic compound from the group consisting of the acids and acid salts of nitric and phosphoric acids, an alkaline waste liquor produced by the steps of subjecting cellulosic material to pulping treatment with an alkaline pulping liquor containing an alkaline-acting potassium compound in major proportion under conditions normal for the production of a paper making pulp, the digestion liquor being maintained alkaline throughout the digestion, and separating the resulting pulp from the mass so produced.

6. The process defined in claim 5, in which the acidic compound is an acidic salt of phosphoric acid.

7. The process defined in claim 5 in which the alkaline digestion liquor contains in major quantity potassium hydroxide and in minor quantity a digestion modifying agent of the group consisting of potassium sulphide, sodium hydroxide and sodium sulphide.

8. The process defined in claim 5 in which the alkaline digestion liquor contains in major quantity potassium hydroxide and in minor quantity potassium sulphide.

9. The process defined in claim 5 in which the alkaline digestion liquor contains in major quantity potassium hydroxide and in minor quantity potassium sulphide, sodium hydroxide and sodium sulphide.

10. The process defined in claim 5 in which the alkaline digestion liquor contains in major quantity potassium hydroxide and in minor quantity potassium sulphide and sodium hydroxide.

HAROLD R. MURDOCK.